H. P. DAMSMA.
FISH BAIT OR LURE.
APPLICATION FILED AUG. 13, 1914.
1,144,756.
Patented June 29, 1915.
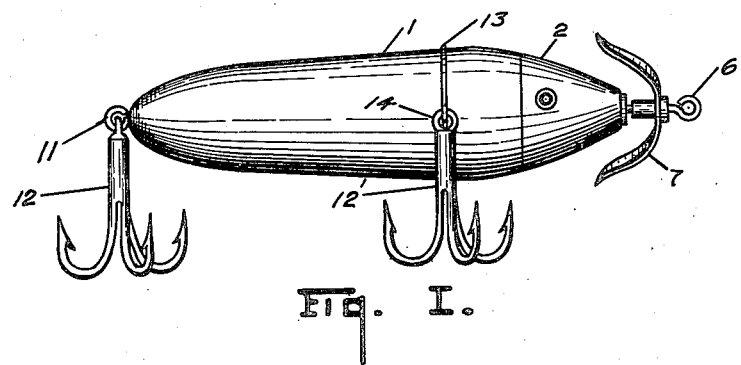
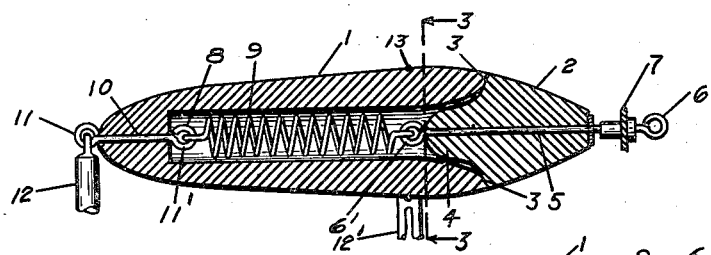
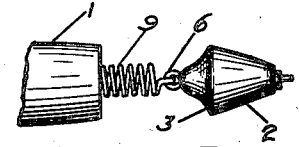
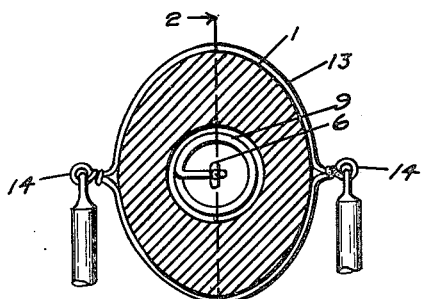
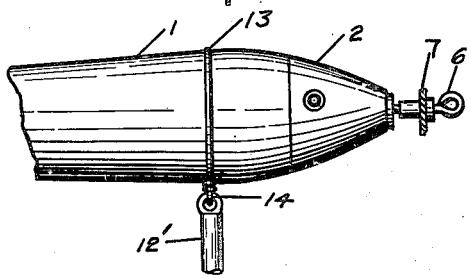
Inventor
Harry P. Damsma.

UNITED STATES PATENT OFFICE.

HARRY P. DAMSMA, OF KALAMAZOO, MICHIGAN.

FISH BAIT OR LURE.

1,144,756.  Specification of Letters Patent.  Patented June 29, 1915.

Application filed August 13, 1914. Serial No. 856,513.

*To all whom it may concern:*

Be it known that I, HARRY P. DAMSMA, a citizen of the United States, residing at Kalamazoo, Michigan, have invented certain new and useful Improvements in Fish Baits or Lures, of which the following is a specification.

This invention relates to inventions in fish baits or lures.

The object of this invention is to provide a bait or lure having a sectional body and a spring connection between the sections so that a sudden jerk on the line will be taken up by the spring and the line will be prevented from breaking.

Further objects and objects relating to details and economies of construction will definitely appear from the detailed description to follow.

I accomplish the objects of my invention by the devices and means described in the following specification.

The invention is clearly defined and pointed out in the claims.

A structure constituting a preferred embodiment of my invention is illustrated in the accompanying drawing forming a part of this specification, in which:

Figure I is a view in side elevation of a bait embodying my invention. Fig. II is a longitudinal sectional view on the line 2—2 of Fig. III. Fig. III is an enlarged transverse sectional view on the line 3—3 of Fig. II. Fig. IV is a detail view in side elevation showing the body sections separated. Fig. V is a fragmentary view in side elevation of a modification.

In the drawing, similar reference characters refer to similar parts throughout the several views, and the sectional views are taken looking in the direction of the little arrows at the ends of the section lines.

Considering the numbered parts of the drawing, the bait illustrated consists of the body portion or section 1 and the head portion or section 2. A socket 8 is formed within the section 1 and the outer edge of the socket is beveled outwardly as at 3. The section 2 has the rearwardly projecting portion 4 which is beveled and fits within the front end of the socket 8, as clearly shown in Fig. II. A link 5 extends through the section 2 and carries an eye 6 at the front end to which the line is adapted to be attached. Link 5 has journaled on the front end thereof the spinner 7. On the rear end of the link 5 is the eye 6'.

A link 10 extends from within the socket 8 through to the rear end of the body section. This link has an eye 11' inside the socket and an eye 11 on the rear end to which the hook 12 may be attached. A spring 9 is disposed within the socket 8 and is attached to one end to the eye 11' of the link 10 and at the other end to the eye 6' of the link 5 carried by the head 2. It will thus be seen that the sections 1 and 2 are separate and are yieldingly held together by the spring 9.

Hooks 12' are provided at the sides and are carried by wire 13 wrapped around the body portions and disposed in a groove provided therein and having parts thereof twisted to form eyes 14 carrying the hooks 12'.

In Fig. V I have shown a modification in which a single hook is provided depending from the middle of the lower part of the body portion, being carried by the eye 14 on the wire 13, as in the preferred form.

From the description of the parts given above, the operation of the device should be very readily understood. Under ordinary conditions the head section 2 will be held in contact with the body portion 1 by means of the spring 9, and the bait will appear to be a one piece bait having a solid body portion. However, in case of a sudden short jerk on the line 1, as when a fish takes the bait, the spring will yield somewhat to permit the head 2 to move away from the body portion 1. This yielding spring will take some of the tension out of the line and prevent its being broken when a very large fish takes the hook. Due to the manner in which the forward edge of the body portion is beveled, as at 3, and the way in which the rearwardly projecting portion 4 of the head 2 is beveled, if the head should be bent to one side somewhat as it is pulled away from the body portion 1 still it will always be guided back to place by the beveled edges so that it will fit snugly in place, as shown in Fig. II. The wire wrapped around the body portion of the bait and having the eyes 14 forms a very simple and effective manner of securing the hooks thereon.

In Fig. IV I show the body section separated as would occur when a fish was hooked, or a hook snagged, or other weight on the rear section, sufficient to partially overcome the tension of the spring.

I am aware that the particular embodiment of my invention which I have here shown is susceptible to considerable variation without departing from the spirit of my invention and, therefore, I do not wish to be restricted to the same. I have found, however, that this form is to be preferred and, therefore, I desire to claim the same specifically, as well as broadly, as indicated by my appended claims.

Having thus described my invention, what I claim as new and desire to secure by Letters Patent, is:

1. A fish bait or lure comprising a body portion provided with a longitudinally extending socket formed therein, the forward edges of said socket being beveled, a head having a rearwardly projecting portion suitably beveled and fitting within the front end of said socket, a link extending longitudinally through said head and provided with line attaching means at its front end, said link having an eye at its inner end, a link extending through the rear end of said body portion and having an eye at its rear end, a hook attached to said eye, said link being provided with an eye at its inner end disposed within said socket, and a spring within said socket and attached at its ends to the eyes at the inner ends of said links, all coacting substantially as described for the purpose specified.

2. A fish bait or lure comprising a body portion provided with a longitudinally extending socket formed therein, a head having a rearwardly projecting portion fitting within the front end of said socket, a link extending longitudinally through said head and provided with line attaching means at its front end, said link having an eye at its inner end, a link extending through the rear end of said body portion and having an eye at its rear end, a hook attached to said eye, said link being provided with an eye at its inner end disposed within said socket, and a spring within said socket and attached at its ends to the eyes at the inner ends of said links, all coacting substantially as described for the purpose specified.

3. A fish bait or lure comprising a body portion provided with a longitudinally extending socket formed therein, a head having a rearwardly projecting portion fitting within the front end of said socket, a link extending longitudinally through said head and provided with line attaching means at its front end, said link having an eye at its inner end, a link extending through the rear end of said body portion and provided with an eye at its inner end disposed within said socket, and a spring within said socket, and attached at its ends to the eyes at the inner ends of said links, all coacting substantially as described for the purpose specified.

4. A fish bait or lure comprising a body portion provided with a longitudinally extending socket formed therein, a head having a rearwardly projecting portion fitting within the front end of said socket, a link extending longitudinally through said head and having an eye at its inner end, a link extending through the rear end of said body portion and provided with an eye at its inner end disposed within said socket, and a spring within said socket, and attached at its ends to the eyes at the inner ends of said links, all coacting substantially as described for the purpose specified.

5. A fish bait or lure, comprising a body portion provided with a longitudinally extending chamber formed therein, a head portion closing the front end of said chamber, a spring disposed in said chamber and connected at its ends with the body portion and the head portion respectively, hooks and hook attaching means, substantially as described and for the purpose specified.

6. A fish bait or lure, comprising a body portion, a head portion, a yieldable spring connection between said body portion and said head portion, hooks and hook attaching means, substantially as described.

7. A fish bait or lure comprising a sectional body, one of the sections being chambered, the other being provided with a projection having telescoping engagement with said chamber, a spring disposed in said chamber and connected to said sections whereby they are held normally together, and suitable hooks carried by one section, the other being provided with a line attaching means, all coacting for the purpose specified.

8. A fish bait or lure, comprising a sectional body, one of the sections being chambered, said sections being provided with coacting male and female joint portions, a spring disposed in said chambered section and connected to said sections, whereby they are yieldingly held together and a hook carried by one of said sections, the other section being provided with line attaching means.

In witness whereof, I have hereunto set my hand and seal in the presence of two witnesses.

HARRY P. DAMSMA. [L. S.]

Witnesses:
LUELLA G. GREENFIELD,
ADELE A. SCHINDLER.